US009900184B2

(12) United States Patent
Wei et al.

(10) Patent No.: US 9,900,184 B2
(45) Date of Patent: Feb. 20, 2018

(54) METHOD, DEVICE AND STORAGE MEDIUM FOR FREQUENCY OFFSET ESTIMATE

(71) Applicant: ZTE Corporation, Shenzhen (CN)

(72) Inventors: Jidong Wei, Shenzhen (CN); Bin Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/329,065

(22) PCT Filed: Nov. 27, 2014

(86) PCT No.: PCT/CN2014/092359
§ 371 (c)(1),
(2) Date: Jan. 25, 2017

(87) PCT Pub. No.: WO2016/019657
PCT Pub. Date: Feb. 11, 2016

(65) Prior Publication Data
US 2017/0214552 A1    Jul. 27, 2017

(30) Foreign Application Priority Data

Aug. 7, 2014  (CN) .......................... 2014 1 0387070

(51) Int. Cl.
*H04L 25/02* (2006.01)
*H04L 27/26* (2006.01)
(52) U.S. Cl.
CPC .......... *H04L 25/0224* (2013.01); *H04L 27/26* (2013.01); *H04L 27/2657* (2013.01);
(Continued)
(58) Field of Classification Search
CPC . H04L 25/0202; H04L 25/0224; H04L 27/26; H04L 27/2657; H04L 27/2695
See application file for complete search history.

(56) References Cited

U.S. PATENT DOCUMENTS 7,027,429 B2 *  4/2006  Laroia ................ H04L 27/2659
                                                              370/350
7,257,102 B2    8/2007  Min
                      (Continued)

FOREIGN PATENT DOCUMENTS

CN        101001231 A    7/2007
CN        101309108 A    11/2008
                (Continued)

OTHER PUBLICATIONS

Zonghua Sun et al: "Joint estimation of carrier and sampling frequency offset for OFDM systems in slow fading channel", Communication Technology (ICCT), 2012 IEEE 14th International Conference on, IEEE, Nov. 9, 2012 (Nov. 9, 2012), pp. 148-154, XP032390259,DOI: 10.1109/ICCT.2012.6511205 ISBN:978-1-4673-2100-6 * Sections III. and IV. *, mailed on Nov. 9, 2012.
(Continued)

*Primary Examiner* — David B. Lugo
(74) *Attorney, Agent, or Firm* — Oppedahl Patent Law Firm LLC

(57) ABSTRACT

The present invention provides a method, device and storage medium for frequency offset estimate, and the method for frequency offset estimate comprises: performing initial channel estimate by receiving an Sounding Reference Signal (SRS) or a Preamble code transmitted by a User Equipment (UE) to obtain a first frequency offset estimate value of a current sub-frame of the UE (S101); determining a frequency offset range in which the first frequency offset estimate value is located, and obtaining an initial frequency offset value corresponding to the first frequency offset estimate value according to the preset correspondence between the range of the frequency offset and the initial frequency offset value (S102); determining a phase difference of adjacent pilot positions based on a received pilot sequence included in the current sub-frame, and obtaining a
(Continued)

dual pilot frequency offset estimate value according to the phase difference within the range limited by the initial frequency offset value corresponding to the first frequency offset estimate value (S103); and acquiring a frequency offset estimate value of the current sub-frame according to the initial frequency offset value corresponding to the first frequency offset estimate value and the dual pilot frequency offset estimate value (S104).

18 Claims, 1 Drawing Sheet

(52) U.S. Cl.
CPC ...... *H04L 27/2671* (2013.01); *H04L 27/2675* (2013.01); *H04L 27/2682* (2013.01); *H04L 27/2686* (2013.01); *H04L 27/2695* (2013.01)

(56) References Cited

U.S. PATENT DOCUMENTS

| | | | |
|---|---|---|---|
| 7,515,567 B2 | 4/2009 | Min | |
| 2003/0185180 A1 | 10/2003 | Min | |
| 2007/0268871 A1 | 11/2007 | Min | |
| 2013/0116957 A1* | 5/2013 | Qiu | H04L 27/266 702/75 |
| 2015/0063507 A1* | 3/2015 | Dore | H04L 25/03159 375/348 |
| 2017/0141899 A1* | 5/2017 | Lu | H04L 5/0048 |

FOREIGN PATENT DOCUMENTS

| | | |
|---|---|---|
| CN | 101547062 A | 9/2009 |
| CN | 102315908 A | 1/2012 |
| CN | 102571647 A | 7/2012 |

OTHER PUBLICATIONS

Jang Woong Park et al: "Efficient coarse frequency synchronizer using serial correlator for DVB-S2",Circuits and Systems, 2008. ISCAS 2008. IEEE International Symposium on, IEEE, Piscataway, NJ, USA,May 18, 2008 (May 18, 2008), pp. 1520-1523. XP031392274,ISBN: 978-1-4244-1683-7* figure 1; table 1 * * Sections I. and II. *, mailed on May 18, 2008.

Juan Zheng et al: "A Novel Timing and Frequency Synchronization Scheme for MIMO OFDM System",Wireless Communications, Networking and Mobile Computing, 2007. WICOM 2007.International Conference on, IEEE, Piscataway, NJ, USA, Sep. 21, 2007 (Sep. 21, 2007), pp. 420-423, XP031261286 ISBN: 978-1-4244-1311-9 * Section III. *, mailed on Sep. 21, 2007.

Supplementary European Search Report in European application No. 14899441.1, dated Jul. 19, 2017.

International Search Report in international application No. PCT/CN2014/092359, dated Apr. 29, 2015.

English Translation of the Written Opinion of the International Search Authority in international application No. PCT/CN2014/092359, dated Apr. 29, 2015.

\* cited by examiner

METHOD, DEVICE AND STORAGE MEDIUM FOR FREQUENCY OFFSET ESTIMATE

TECHNICAL FIELD

The disclosure relates to the technology of communication signal processing, and in particular to a method, device and storage medium for frequency offset estimation.

BACKGROUND

A technology of Orthogonal Frequency Division Multiplexing (OFDM) is a kind of multicarrier transmission technology with subcarriers orthogonal to each other, which requires the subcarriers to be orthogonal to each other and is sensitive to the carrier frequency offset. Therefore, the problem of carrier frequency offset becomes one of the principal problems of the current OFDM technology.

At present, to solve the problem of a small frequency offset, there are many methods of a high precision and with simple implementation. However, for the problem of a large frequency offset, the precision for these solutions is relatively low, even though the precision of frequency offset estimation for some methods is improved, the complexity of the implementation are increased.

SUMMARY

To solve the above technical problem, embodiments of the disclosure intend to provide a method, device and storage medium for frequency offset estimation, which, for the problem of large frequency offset, ensure the precision of frequency offset estimation and reduce the complexity of estimation of large frequency offset.

The solutions claimed in the embodiments of the disclosure are implemented as follows.

In the first aspect, a method for frequency offset estimation is provided in the embodiments of the disclosure, the method may include:

performing initial channel estimation with a received Sounding Reference Signal (SRS) or Preamble code to obtain a first frequency offset estimation value of a current sub-frame;

determining a frequency offset range in which the first frequency offset estimation value is located, and obtaining an initial frequency offset value corresponding to the first frequency offset estimation value according to a preset correspondence between the frequency offset range and the initial frequency offset value;

determining a phase difference of adjacent pilot locations based on a received pilot sequence included in the current sub-frame, and obtaining, within the range defined by the initial frequency offset value corresponding to the first frequency offset estimation value, a dual pilot frequency offset estimation value according to the phase difference; and obtaining a frequency offset estimation value of the current sub-frame according to the initial frequency offset value corresponding to the first frequency offset estimation value and the dual pilot frequency offset estimation value.

As one of the embodiments, the performing initial channel estimation with the received SRS or Preamble code to obtain the first frequency offset estimation value of the current sub-frame includes:

obtaining a channel estimation value $H^u$ and received data $Y^u$ by receiving the SRS or Preamble code of the current sub-frame;

obtaining a time-domain sample value $w^u(n,ka_{Rx})$ of the current sub-frame on a receiving antenna $ka_{Rx}$ according to the channel estimation value $H^u$ and the received data $Y^u$ and in combination with a local pilot sequence $P^u$ and the following formula:

$$w^u(n,ka_{Rx}) = IDFT(Y^u(k,ka_{Rx}) \times H^{u*}(k,ka_{Rx})) \times (IDFT(P^u(k)))^*,$$

where n represents a series number of a sample point, u represents a User Equipment (UE) corresponding to the current sub-frame, k represents a sub-carrier index corresponding to the UE, $0 \leq k \leq 12N_{RB}^u - 1$, $ka_{Rx}$ represents an index of the receiving antenna, $N_{RB}^u$ represents a size of a Resource Block (RB) occupied by the UE, * represents a conjugate operation, and IDFT represents an inverse Fourier transform; and obtaining the first frequency offset estimation value $f_0^u(ka_{Rx})$ of the current sub-frame on the receiving antenna $ka_{Rx}$ according to phase information of the time-domain sample value $w^u(n,ka_{Rx})$ of the current sub-frame on the receiving antenna $ka_{Rx}$.

As one of the embodiments, the obtaining the first frequency offset estimation value $f_0^u(ka_{Rx})$ of the current sub-frame on the receiving antenna $ka_{Rx}$ according to the phase information of the time-domain sample value $w^u(n,ka_{Rx})$ of the current sub-frame on the receiving antenna $ka_{Rx}$ includes:

averaging respectively phase values of a first half and a second half of the time-domain sample value $(n,ka_{Rx})$ of the current sub-frame to obtain a phase difference $\Delta\phi_1^u(ka_{Rx})$ of the first half and the second half; and obtaining the first frequency offset estimation value $f_0^u(ka_{Rx})$ of the current sub-frame on the receiving antenna $ka_{Rx}$ according to the following formula:

$$f_0^u(ka_{Rx}) = \frac{\Delta\phi_1^u(ka_{Rx}) \times 2 \times \Delta f}{\pi}.$$

As one of the embodiments, the method further includes:

performing a smoothing processing on the first frequency offset estimation value $f_0^u(ka_{Rx})$ of the current sub-frame on the receiving antenna $ka_{Rx}$ to obtain a smoothed first frequency offset estimation value $f_1^{(u)}(ka_{Rx})$ of the current sub-frame.

As one of the embodiments, the step of determining the phase difference of adjacent pilot locations based on the received pilot sequence included in the current sub-frame and obtaining, within the range defined by the initial frequency offset value corresponding to the first frequency offset estimation value, the dual pilot frequency offset estimation value according to the phase difference includes:

obtaining a phase difference $\Delta\phi_2^u(ka_{Rx})$ of two pilot locations on the receiving antenna $ka_{Rx}$ based on two pilot channel estimation values $H_1^u(k,ka_{Rx})$ and $H_2^u(k,ka_{Rx})$ obtained from two pilot sequences included in the current sub-frame on the receiving antenna $ka_{Rx}$ and according to the following formula:

$$\Delta\phi_2^u(ka_{Rx}) = \text{angle}\left(\sum_{k=0}^{12N_{RB}^{u2}-1} H_1^u(k,ka_{Rx}) \times H_2^{u*}(k,ka_{Rx})\right),$$

where * represents a conjugate operator, and angle( ) represents an operator for calculating an angle;

obtaining a dual pilot frequency offset estimation result $\Delta f_2^{(u)}(ka_{Rx})$ on the receiving antenna $ka_{Rx}$ based on a time interval $\Delta t$ and the phase difference $\Delta\phi_2^{u}(ka_{Rx})$ of the two pilot sequences and according to the following formula:

$$\Delta f_2^{(u)}(ka_{Rx}) = \frac{\Delta\phi_2^u(ka_{Rx})}{2\pi \times \Delta t};$$

and obtaining, within the range defined by the initial frequency offset value $\overline{\Delta f_{initial}}^{(u)}(ka_{Rx})$, the dual pilot frequency offset estimation value $\Delta\Delta f_2(ka_{Rx})$ on the receiving antenna $ka_{Rx}$ based on the dual pilot frequency offset estimation result $\Delta f_2^{(u)}(ka_{Rx})$ and according to the following formula:

$$\Delta\Delta f_2(ka_{Rx}) = \Delta f_2^{(u)}(ka_{Rx}) - \overline{\Delta f_{initial}}^{(u)}(ka_{Rx}) + l \times T,$$

where T represents the maximum range values for the dual pilot frequency offset estimation value, and l represents a preset integer for defining the dual pilot frequency offset estimation value within a predetermined range.

As one of the embodiments, after the obtaining the frequency offset estimation value of the current sub-frame according to the initial frequency offset value corresponding to the first frequency offset estimation value and the dual pilot frequency offset estimation value, the method further includes:

performing a smoothing processing on the frequency offset estimation value $f^u(ka_{Rx})$ of the current sub-frame by means of filtering to obtain a smoothed frequency offset estimation value $f^{(u)}(ka_{Rx})$ of the current sub-frame.

In the second aspect, a device for frequency offset estimation is provided in the embodiments of the disclosure, and the device includes a first acquisition unit, a second acquisition unit, a third acquisition unit and a fourth acquisition unit, the first acquisition unit is configured to perform initial channel estimation with a received Sounding Reference Signal (SRS) or Preamble code to obtain a first frequency offset estimation value of a current sub-frame;

the second acquisition unit is configured to determine a frequency offset range in which the first frequency offset estimation value is located and obtain an initial frequency offset value corresponding to the first frequency offset estimation value according to a preset correspondence between the frequency offset range and the initial frequency offset value;

the third acquisition unit is configured to determine a phase difference of adjacent pilot locations based on a received pilot sequence included in the current sub-frame and obtain, within the range defined by the initial frequency offset value corresponding to the first frequency offset estimation value, a duel pilot frequency offset estimation value according to the phase difference; and the fourth acquisition unit is configured to obtain a frequency offset estimation value of the current sub-frame according to the initial frequency offset value corresponding to the first frequency offset estimation value and the dual pilot frequency offset estimation value.

As one of the embodiments, the first acquisition unit is configured to:

obtain a channel estimation value $H^u$ and received data $Y^u$ by receiving the SRS or Preamble code of the current sub-frame;

obtain a time-domain sample value $w^u(n,ka_{Rx})$ of the current sub-frame on a receiving antenna $ka_{Rx}$ according to the channel estimation value $H^u$ and the received data $Y^u$ and in combination with a local pilot sequence $P^u$ and the following formula:

$$w^u(n,ka_{Rx}) = IDFT(Y^u(k,ka_{Rx}) \times H^{u*}(k,ka_{Rx})) \times (IDFT(P^u(k)))^*,$$

where n represents a series number of a sample point, u represents a User Equipment (UE) corresponding to the current sub-frame, k represents a sub-carrier index corresponding to the UE, $0 \le k \le 12N_{RB}^u - 1$, $ka_{Rx}$ represents an index of the receiving antenna, $N_{RB}^u$ represents a size of a Resource Block (RB) occupied by the UE, * represents a conjugate operation, and IDFT represents an inverse Fourier transform; and obtain the first frequency offset estimation value $f_0^u(ka_{Rx})$ of the current sub-frame on the receiving antenna $ka_{Rx}$ according to phase information of the time-domain sample value $w^u(n,ka_{Rx})$ of the current sub-frame on the receiving antenna $ka_{Rx}$.

As one of embodiments, the first acquisition unit is configured to:

average respectively phase values of a first half and a second half of the time-domain sample value $w^u(n,ka_{Rx})$ of the current sub-frame to obtain a phase difference $\Delta\phi_1^u(ka_{Rx})$ of the first half and the second half; and obtain the first frequency offset estimation value $f_0^u(ka_{Rx})$ of the current sub-frame on the receiving antenna $ka_{Rx}$ according to the following formula:

$$f_0^u(ka_{Rx}) = \frac{\Delta\phi_1^u(ka_{Rx}) \times 2 \times \Delta f}{\pi}.$$

As one of the embodiments, the first acquisition unit is further configured to perform a smoothing processing on the first frequency offset estimation value $f_0^u(ka_{Rx})$ of the current sub-frame on the receiving antenna $ka_{Rx}$ to obtain a smoothed first frequency offset estimation value $f_1^{(u)}(ka_{Rx})$ of the current sub-frame.

As one of the embodiments, the third acquisition unit is configured to:

obtain a phase difference $\Delta\phi_2^u(ka_{Rx})$ of two pilot locations on the receiving antenna $ka_{Rx}$ based on two pilot channel estimation values $H_1^u(k,ka_{Rx})$ and $H_2^u(k,ka_{Rx})$ obtained from two pilot sequences included in the current sub-frame on the receiving antenna $ka_{Rx}$ and according to the following formula:

$$\Delta\phi_2^u(ka_{Rx}) = \text{angle}\left(\sum_{k=0}^{12N_{RB}^2 - 1} H_1^u(k, ka_{Rx}) \times H_2^{u*}(k, ka_{Rx})\right),$$

where * represents a conjugate operator, and angle( ) represents an operator for calculating an angle;

obtain a dual pilot frequency offset estimation result $\Delta f_2^{(u)}(ka_{Rx})$ on the receiving antenna $ka_{Rx}$ based on a time interval $\Delta t$ and a phase difference $\Delta\phi_2^u(ka_{Rx})$ of the two pilot sequences and according to the following formula:

$$\Delta f_2^{(u)}(ka_{Rx}) = \frac{\Delta\phi_2^u(ka_{Rx})}{2\pi \times \Delta t};$$

and obtain, within the range defined by the initial frequency offset value $\overline{\Delta f_{initial}}^{(u)}(ka_{Rx})$, a dual pilot frequency offset estimation value $\Delta\Delta f_2(ka_{Rx})$ on the receiving antenna $ka_{Rx}$ based on the dual pilot frequency offset estimation result $\Delta f_1^{(u)}(ka_{Rx})$ and according to the following formula:

$$\Delta\Delta f_2(ka_{Rx})=\Delta f_2^{(u)}(ka_{Rx})-\overline{\Delta f_{initial}}^{(u)}(ka_{Rx})+l\times T,$$

where T represents the maximum range values for the dual pilot frequency offset estimation value, and l represents a preset integer for defining the dual pilot frequency offset estimation value within a predetermined range.

As one of the embodiments, the fourth acquisition unit is further configured to perform a smoothing processing on the frequency offset estimation value $f^u(ka_{Rx})$ of the current sub-frame by means of filtering to obtain a smoothed frequency offset estimation value $f^{(u)}(ka_{Rx})$ of the current sub-frame.

A storage medium, in which a computer program is stored, is provided, and the computer program is configured to execute the above method for frequency offset estimation.

In the embodiments of the disclosure, an initial frequency offset value is obtained according to a first frequency estimation value determined with a SRS or Preamble code sent by a UE, and a frequency offset estimation value of the current sub-frame is obtained within a range of the initial frequency offset estimation value and in combination with a dual pilot frequency offset estimation value. Thus, the precision of frequency offset estimation is ensured, and the complexity of large frequency offset estimation is reduced.

DETAILED DESCRIPTION

The technical solutions in the embodiments of the disclosure will be described clearly and completely in connection with the drawings of the embodiments of the disclosure.

Figure 1:
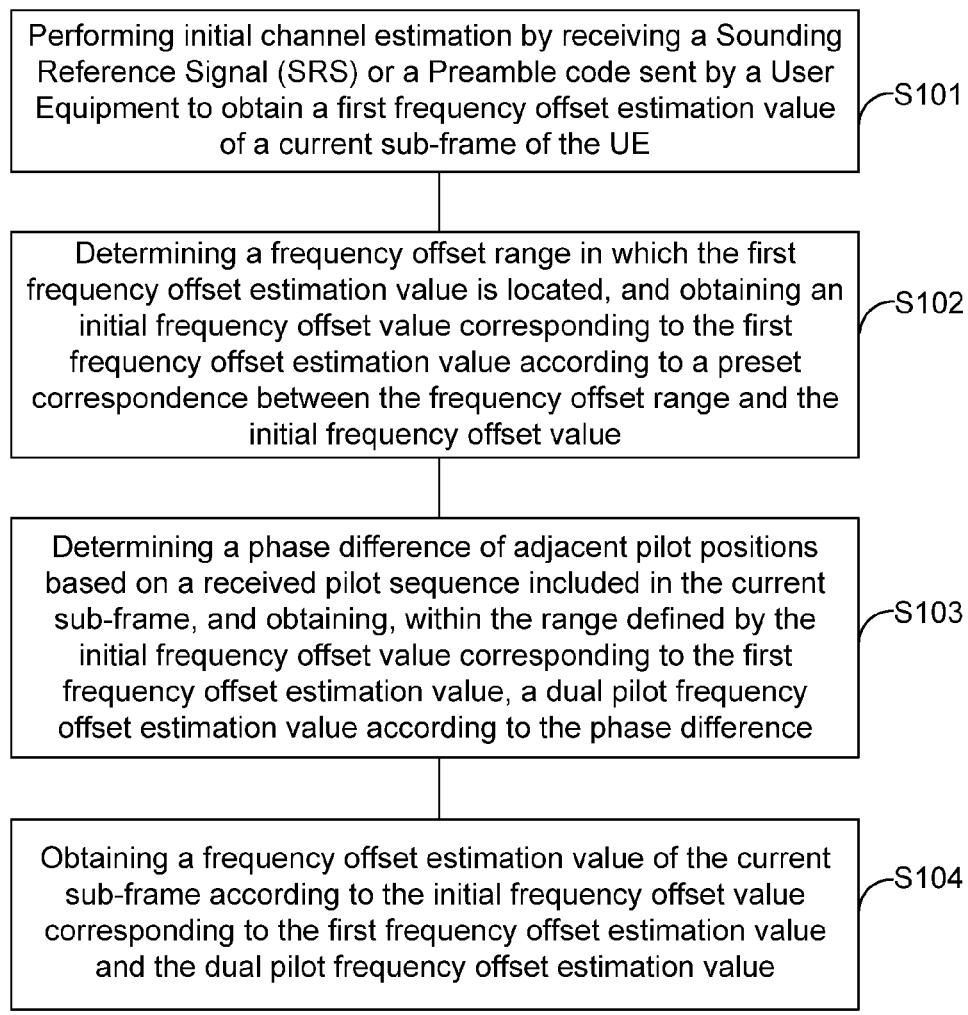
FIG. 1 is a flowchart of a method for frequency offset estimation according to an embodiment of the disclosure.

Referring to FIG. 1, which shows a flow of a method for frequency offset estimation provided by the embodiments of the disclosure. It should be noted that in order to clearly describe the technical solutions of the embodiments of the disclosure, the embodiments take one User Equipment (UE) as an example. It will be understood for those skilled in the art to apply the embodiments taking one UE as the example to embodiments with a plurality of UEs without creative labor. The method may include the following steps.

At S101: initial channel estimation is performed by receiving a Sounding Reference Signal (SRS) or a Preamble code sent by a User Equipment (UE) to obtain a first frequency offset estimation value of a current sub-frame of the UE.

Exemplarily, step S101 may specifically include:

firstly, obtaining a channel estimation value $H^u$ and received data $Y^u$ of the UE by receiving a SRS or a Preamble code of a current sub-frame sent by the UE, and the specific process for the obtaining is conventional implementation means for those skilled in the art, which will not be repeated here;

secondly, obtaining a time-domain sample value $w^u(n, ka_{Rx})$ of the current sub-frame of the UE on a receiving antenna $ka_{Rx}$ based on the channel estimation value $H^u$ and the received data $Y^u$ of the UE and in combination with a local pilot sequence $P^u$ and Formula 1:

$$w^u(n,ka_{Rx})=IDFT(Y^u(k,ka_{Rx})\times H^{u*}(k,ka_{Rx}))\times (IDFT(P^u(k)))^* \qquad (1)$$

where n represents a series number of a sample point, u represents the UE, k represents a sub-carrier index corresponding to the UE $0\leq k\leq 12N_{RB}^u-1$, $ka_{Rx}$ represents an index of the receiving antenna, $N_{RB}^u$ represents a size of a Resource Block (RB) occupied by the UE, * represents a conjugate operation, and IDFT represents an inverse Fourier transform; and thirdly, obtaining a first frequency offset estimation value $f_0^u(ka_{Rx})$ of the current sub-frame of the UE on the receiving antenna $ka_{Rx}$ according to phase information of a time-domain sample value $w^u(n,ka_{Rx})$ of the current sub-frame of the UE on the receiving antenna $ka_{Rx}$. In detail, in the present embodiment, phase values of a first half and a second half of the time-domain sample value $w^u(n,ka_{Rx})$ of the current sub-frame can be averaged respectively to obtain a phase difference $\Delta\phi_1^u(ka_{Rx})$ of the first half and the second half, and $\Delta\phi_1^u(ka_{Rx})$ can be also obtained by averaging a phase difference of adjacent sample points of the time-domain sample value $w^u(n,ka_{Rx})$ of the current sub-frame. Then, a first frequency offset estimation value $f_0^u(ka_{Rx})$ of the current sub-frame of the UE on the receiving antenna $ka_{Rx}$ is obtained according to Formula 2:

$$f_0^u(ka_{Rx}) = \frac{\Delta\phi_1^u(ka_{Rx})\times 2\times\Delta f}{\pi}. \qquad (2)$$

As one of the embodiments, a smoothing processing can be performed on $f_0^u(ka_{Rx})$ obtained by Formula 2, so as to obtain a smoothed first frequency offset estimation value $f_0^{(u)}(ka_{Rx})$ of the current sub-frame. Specifically, a weighted summation can be made on the first frequency offset estimation value $f_0^u(ka_{Rx})$ corresponding to the sub-frame before the current sub-frame. It will be understood the weight becomes larger as it is closer to the current sub-frame in time, and the weight becomes smaller as it is further away from the current sub-frame in time.

In the embodiments, a smoothing processing can be performed on $f_0^u(ka_{Rx})$ by making the weighted summation on the basis of a first frequency offset estimation value $\overline{f_{n\_subframe-1}}^{(u)}$ corresponding to the previous sub-frame before the current sub-frame and $f_0^u(ka_{Rx})$ according to Formula 3, to obtain a smoothed first frequency offset estimation value $f_0^{(u)}(ka_{Rx})$ of the current sub-frame:

$$f_1^{(u)}(ka_{Rx})=(1-p_1)\overline{f_{n\_subframe-1}}^{(u)}(ka_{Rx})+p_1 f_0^u(ka_{Rx}) \qquad (3),$$

where $p_1$ is a filtering factor, and $0\leq p_1\leq 1$.

Understandably, $f_1^{(u)}(ka_{Rx})$ is smoother than $f_0^u(ka_{Rx})$, but $f_0^u(ka_{Rx})$ can be also used for subsequent processing, and taking $f_1^{(u)}(ka_{Rx})$ for subsequent processing is only a particular solution in the embodiments; therefore, for a first frequency offset estimation value used during the subsequent processing, either one of $f_0^u(ka_{Rx})$ and $f_1^{(u)}(ka_{Rx})$ may be selected. However, there is no specific limitation in the embodiments of the disclosure.

At S102: a frequency offset range in which the first frequency offset estimation value is located is determined, and an initial frequency offset value corresponding to the first frequency offset estimation value is obtained according to a preset correspondence between the frequency offset range and the initial frequency offset value.

Exemplarily, the preset correspondence between the frequency offset range and the initial frequency offset value may be a specific table of mapping an upper and lower limit of the frequency offset range with an initial frequency offset value, as shown in Table 1.

TABLE 1

| Range number | Upper limit: Hz | Lower limit: Hz | Initial frequency offset value: Hz |
|---|---|---|---|
| 0 | T1 | T2 | f0 |
| 1 | T3 | T4 | f1 |
| 2 | T5 | T6 | f2 |
| 3 | T7 | T8 | f3 |
| 4 | T9 | T10 | f4 |
| 5 | T11 | T12 | f5 |

It can be seen from Table 1, the first frequency offset estimation value can be compared with the upper and lower limit of each frequency offset range in Table 1 to determine the frequency offset range in which the first frequency offset estimation value is located, and then correspondingly an initial frequency offset value corresponding to the first frequency offset estimation value may be obtained. In the embodiments, $\overline{\Delta f_{initial}}^{(u)}(ka_{Rx})$ can be used to express the initial frequency offset value corresponding to the first frequency offset estimation value of the UE on the receiving antenna $ka_{Rx}$.

At S103: a phase difference of adjacent pilot locations is determined based on a received pilot sequence included in the current sub-frame, and a dual pilot frequency offset estimation value is obtain according to the phase difference within the range defined by the initial frequency offset value corresponding to the first frequency offset estimation value.

As one of the embodiments, in this embodiment, S103 may specifically include:

firstly, obtaining a phase difference $\Delta\phi_2^u(ka_{Rx})$ of two pilot locations of the UE on the receiving antenna $ka_{Rx}$ based on two pilot channel estimation values $H_1^u(k,ka_{Rx})$ and $H_2^u(k,ka_{Rx})$ obtained from two pilot sequences included in the current sub-frame of the UE on the receiving antenna $ka_{Rx}$ and according to Formula 3:

$$\Delta\phi_2^u(ka_{Rx}) = \text{angle}\left(\sum_{k=0}^{12N_{RB}^2-1} H_1^u(k, ka_{Rx}) \times H_2^{u*}(k, ka_{Rx})\right), \quad (3)$$

where * represents a conjugate operator, and angle( ) represents an operator for calculating an angle;

secondly, obtaining a dual pilot frequency offset estimation result $\Delta f_1^{(u)}(ka_{Rx})$ of the UE on the receiving antenna $ka_{Rx}$ based on a time interval $\Delta t$ and a phase difference $\Delta\phi_2^u(ka_{Rx})$ of two pilot sequences and according to Formula 4:

$$\Delta f_2^{(u)}(ka_{Rx}) = \frac{\Delta\phi_2^u(ka_{Rx})}{2\pi \times \Delta t}; \quad (4)$$

and thirdly, obtaining, within the range defined by the initial frequency offset value $\overline{\Delta f_{initial}}^{(u)}(ka_{Rx})$, a dual pilot frequency offset estimation value $\Delta\Delta f_2(ka_{Rx})$ of the UE on the receiving antenna $ka_{Rx}$ according to the dual pilot frequency offset estimation result $\Delta f_2^{(u)}(ka_{Rx})$ and Formula 5:

$$\Delta\Delta f_2(ka_{Rx}) = \Delta f_2^{(u)}(ka_{Rx}) - \overline{\Delta f_{initial}}^{(u)}(ka_{Rx}) + l \times T \quad (5),$$

where T represents the maximum range values for the dual pilot frequency offset estimation value, and l represents a preset integer for defining a dual pilot frequency offset estimation value in a predetermined range.

At S104: a frequency offset estimation value of the current sub-frame is obtained according to the initial frequency offset value corresponding to the first frequency offset estimation value and the dual pilot frequency offset estimation value.

Exemplarily, in the embodiments, a frequency offset estimation value $f''(ka_{Rx})$ of the current sub-frame of the UE on the receiving antenna $ka_{Rx}$ may be obtained by adding the initial frequency offset value $\overline{\Delta f_{initial}}^{(u)}(ka_{Rx})$ and the dual pilot frequency offset estimation value $\Delta\Delta f_2(ka_{Rx})$.

As one of the embodiments, after obtaining the frequency offset estimation value $f''(ka_{Rx})$ of the current sub-frame of the UE on the receiving antenna $ka_{Rx}$, a smoothing processing may be performed on $f''(ka_{Rx})$ by means of filtering to obtain a smoothed frequency offset estimation value $f^{(u)}(ka_{Rx})$ of the current sub-frame.

As one of the embodiments, in this embodiment, a smoothed frequency offset estimation value $f^{(u)}(ka_{Rx})$ of the current sub-frame can be obtained by performing a weighed summation on a frequency offset estimation value $\overline{f_{n\_subframe-1}}^u(ka_{Rx})$ of the previous sub-frame of the UE on the receiving antenna $ka_{Rx}$ and $f''(ka_{Rx})$ according to Formula 6:

$$f^{(u)}(ka_{Rx}) = (1-p_2)\overline{f_{n\_subframe-1}}^u(ka_{Rx}) + p_2 \cdot f''(ka_{Rx}) \quad (6),$$

where $p_2$ is a filtering factor, and $0 \le p_2 \le 1$.

The above scheme provides a method of frequency offset estimation for the embodiments of the disclosure, an initial frequency offset value is obtained according to a first frequency estimation value determined with a SRS or Preamble code sent by the UE, and a frequency offset estimation value of the current sub-frame is obtained within a range of the initial frequency offset value and in combination with a dual pilot frequency offset estimation value. Thus, the precision of frequency offset estimation is ensured, and the complexity of large frequency offset estimation is reduced.

Figure 2:
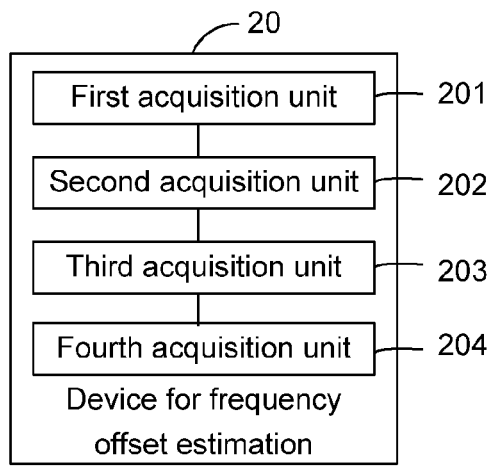
FIG. 2 is a structural diagram of a device for frequency offset estimation according to an embodiment of the disclosure.

Based on the same technical idea as that of the embodiment shown in FIG. 1, and referring to FIG. 2 which shows a device for frequency offset estimation 20 provided by the embodiments of the disclosure, the device 20 may include a first acquisition unit 201, a second acquisition unit 202, a third acquisition unit 203 and a fourth acquisition unit 204, in this device:

the first acquisition unit 201 is configured to perform an initial channel estimation by receiving a SRS or Preamble code sent by a UE to obtain a first frequency offset estimation value of a current sub-frame of the UE;

the second acquisition unit 202 is configured to determine a frequency range in which the first frequency offset estimation value is located and obtain an initial frequency offset value corresponding to the first frequency offset estimation value according to the frequency range and a preset correspondence between the frequency range and an initial frequency offset value;

the third acquisition unit 203 is configured to calculate a phase difference of two pilot locations based on two received pilot sequences included in the current sub-frame of the UE and obtain, within a range defined by the initial frequency offset value, a duel pilot frequency offset estimation value according to the phase difference; and the fourth acquisition unit 204 is configured to obtain a frequency offset estimation value of the current sub-frame according to the initial frequency offset value and the dual pilot frequency offset estimation value.

Exemplarily, the first acquisition unit 201 is configured to:

obtain a channel estimation value $H^u$ and received data $Y^u$ of the UE by receiving a SRS or Preamble code of the current sub-frame sent by the UE;

obtain a time-domain sample value $w^u(n,ka_{Rx})$ of the current sub-frame of the UE on the receiving antenna $ka_{Rx}$ based on the channel estimation value $H^u$ and the received data $Y^u$ of the UE and in combination with a local pilot sequence $P^u$ and according to the following formula:

$$w^u(n,ka_{Rx})=IDFT(Y^u(k,ka_{Rx}) \times H^{u*}(k,ka_{Rx})) \times (IDFT(P^u(k)))^*,$$

where n represents a series number of a sample point, u represents a User Equipment (UE) corresponding to the current sub-frame, k represents a sub-carrier index corresponding to the UE, $0 \leq k \leq 12N_{RB}^u - 1$, $ka_{Rx}$ represents an index of the receiving antenna, $N_{RB}^u$ represents a size of a Resource Block (RB) occupied by the UE, * represents a conjugate operation, and IDFT represents an inverse Fourier transform; and obtain a first frequency offset estimation value $f_0^u(ka_{Rx})$ of the current sub-frame of the UE on the receiving antenna $ka_{Rx}$ according to the phase information of the time-domain sample value $w^u(n,ka_{Rx})$ of the current sub-frame of the UE on the receiving antenna $ka_{Rx}$.

As one of the embodiments, the first acquisition unit 201 is configured to:

average respectively phase values of a first half and s second half of a time-domain sample value $w^u(n,ka_{Rx})$ of the current sub-frame to obtain a phase difference $\Delta\phi_1^u(ka_{Rx})$ of the first half and the second half; and obtain a first frequency offset estimation value $f_0^u(ka_{Rx})$ of the current sub-frame of the UE on the receiving antenna $ka_{Rx}$ according to the following formula:

$$f_0^u(ka_{Rx}) = \frac{\Delta\phi_1^u(ka_{Rx}) \times 2 \times \Delta f}{\pi}.$$

As one of the embodiments, the first acquisition unit 201 is further configured to perform a smoothing processing on the first frequency offset estimation value $f_0^u(ka_{Rx})$ of the current sub-frame of the UE on the receiving antenna $ka_{Rx}$ to obtain a smoothed first frequency offset estimation value $f_1^{(u)}(ka_{Rx})$ of the current sub-frame. Specifically, the first acquisition unit 201 can perform a weighted summation on a first frequency offset estimation value $f_0^{(u)}(ka_{Rx})$ corresponding to the sub-frame before the current sub-frame. Understandably, the weight becomes larger as it is closer to the current sub-frame in time, and the weight becomes smaller when it is further away from the current sub-frame in time.

In the embodiments, the first acquisition unit 201 can perform a smoothing processing on $f_0^u(ka_{Rx})$ by performing a weighted summation on the basis of a first frequency offset estimation value $\overline{f_{n\_subframe-1}}^{(u)}$ corresponding to the previous sub-frame before the current sub-frame and according to the following formula, to obtain a smoothed first frequency offset estimation value $f_1^{(u)}(ka_{Rx})$ of the current sub-frame:

$$f_1^{(u)}(ka_{Rx})=(1-p_1)\overline{f_{n\_subframe-1}}^{(u)}(ka_{Rx})+p_1 f_0^u(ka_{Rx}),$$

where $p_1$ is a filtering factor, and $0 \leq p_1 \leq 1$.

Understandably, $f_1^{(u)}(ka_{Rx})$ is smoother than $f_0^u(ka_{Rx})$, but $f_0^u(ka_{Rx})$ can be also used for processing by a subsequent module, and taking $f_1^{(u)}(ka_{Rx})$ used for processing by a subsequent module is only a particular solution in the embodiments; therefore, for a first frequency offset estimation value used in the processing by a subsequent module, either one of $f_0^u(ka_{Rx})$ and $f_1^{(u)}(ka_{Rx})$ may be selected. However, there is no specific limitation in the embodiments of the disclosure.

Exemplarily, the preset correspondence between the frequency range and the initial frequency offset value can be a specific table of mapping an upper and lower limit of a frequency range and an initial frequency offset value, as shown in Table 1.

As one of the embodiments, it can be seen from Table 1 that the second acquisition unit 202 can be configured to compare the first frequency offset estimation value with an upper limit and a lower limit of each frequency range in Table 1 in order to determine a frequency range in which the first frequency offset estimation value is located, and also correspondingly obtain an initial frequency offset value corresponding to the first frequency offset estimation value. In the embodiments, $\overline{\Delta f_{initial}}^{(u)}(ka_{Rx})$ can be used to express an initial frequency offset value corresponding to the first frequency offset estimation value of the UE on the receiving antenna $ka_{Rx}$.

Exemplarily, the third acquisition unit 203 is configured to:

obtain a phase difference $\Delta\phi_2^u(ka_{Rx})$ of two pilot locations of the UE on the receiving antenna $ka_{Rx}$ based on two pilot channel estimation values, $H_1^u(k,ka_{Rx})$ and $H_2^u(k,ka_{Rx})$, obtained from two pilot sequences included in the current sub-frame of the UE on the receiving antenna $ka_{Rx}$ and according to the following formula:

$$\Delta\phi_2^u(ka_{Rx}) = angle\left(\sum_{k=0}^{12N_{RB}^2-1} H_1^u(k, ka_{Rx}) \times H_2^{u*}(k, ka_{Rx})\right),$$

where * represents a conjugate operator, and angle( ) represents an operator for calculating an angle;

obtain a dual pilot frequency offset estimation result $\Delta f_2^{(u)}(ka_{Rx})$ of the UE on the receiving antenna $ka_{Rx}$ based on a time interval $\Delta t$ and a phase difference $\Delta\phi_2^u(ka_{Rx})$ of the two pilot sequences and according to the following formula:

$$\Delta f_2^{(u)}(ka_{Rx}) = \frac{\Delta\phi_2^u(ka_{Rx})}{2\pi \times \Delta t};$$

and obtain, within the range defined by the initial frequency offset value, a dual pilot frequency offset estimation value $\Delta\Delta f_2(ka_{Rx})$ of the UE on the receiving antenna $ka_{Rx}$ according to the dual pilot frequency offset estimation result $\Delta f_2^{(u)}(ka_{Rx})$ and the following formula:

$$\Delta\Delta f_2(ka_{Rx})=\Delta f_2^{(u)}(ka_{Rx})-\overline{\Delta f_{initial}}^{(u)}(ka_{Rx})+l \times T,$$

where T represents the maximum range values of the dual pilot frequency offset estimation value, and l represents a preset integer for defining the dual pilot frequency offset estimation value within a predetermined range.

As one of the embodiments, in this embodiment, the fourth acquisition unit 204 can obtain a frequency offset estimation value $f^u(ka_{R_x})$ of the current sub-frame of the UE on the receiving antenna $ka_{R_x}$ by adding the initial frequency offset value $\overline{\Delta f_{initial}}^{(u)}(ka_{R_x})$ and the dual pilot frequency offset estimation value $\Delta\Delta f_2(ka_{R_x})$.

As one of the embodiments, after obtaining a frequency offset estimation value $\overline{\Delta f_{initial}}^{(u)}(ka_{R_x})$ of the current sub-frame of the UE on the receiving antenna $ka_{R_x}$, the fourth acquisition unit 204 is further configured to perform a smoothing processing on the frequency offset estimation value $f^u(ka_{R_x})$ of the current sub-frame by means of filtering to obtain a smoothed frequency offset estimation value $f^{(u)}(ka_{R_x})$ of the current sub-frame.

As one of the embodiments, in this embodiment, the fourth acquisition unit 204 can obtain a smoothed frequency offset estimation value $f^{(u)}(ka_{R_x})$ of the current sub-frame by performing a weighed summation on a frequency offset estimation value $\overline{f_{n\_subframe-1}}^u(ka_{R_x})$ of a previous sub-frame of the UE on the receiving antenna $ka_{R_x}$ and $f^u(ka_{R_x})$ according to the following formula:

$$f^{(u)}(ka_{R_x})=(1-p_2)\overline{f_{n\_subframe-1}}^u(ka_{R_x})+p_2 \cdot f^u(ka_{R_x}),$$

where $p_2$ is a filtering factor, and $0 \leq p_2 \leq 1$.

The embodiments provide a device for frequency offset estimation 20, an initial frequency offset value is obtained according to a first frequency offset estimation value determined with a SRS or Preamble code sent by the UE, and a frequency offset estimation value of the current sub-frame is obtained within the range of the initial frequency offset value and in combination with a dual pilot frequency offset estimation value. Thus, the precision of frequency offset estimation is ensured, and the complexity of large frequency offset estimation is reduced.

The embodiments of the disclosure further disclose a storage medium in which a computer program is stored, and the computer program is configured to execute the method for frequency offset estimation mentioned in above embodiments.

Those skilled in the art should understand that the embodiments of the disclosure can provide a method, a system or a computer program product. Thus, forms of hardware embodiments, software embodiments or embodiments combining both software and hardware can be adopted in the disclosure. Moreover, a form of the computer program product implemented on one or more computer available storage media (including, without limitation to, a magnetic disk storage, an optical storage and the like) containing computer available program codes can be adopted in the disclosure.

The disclosure is described with reference to flowcharts and/or block diagrams of the method, the device (system) and the computer program product according to the embodiments of the disclosure. It should be understood that each flow and/or block in the flowcharts and/or the block diagrams and a combination of the flows and/or the blocks in the flowcharts and/or the block diagrams can be realized by computer program instructions. These computer program instructions can be provided for a general computer, a dedicated computer, an embedded processor or processors of other programmable data processing devices to generate a machine, so that an apparatus for realizing functions assigned in one or more flows of the flowcharts and/or one or more blocks of the block diagrams is generated via instructions executed by the computers or the processors of the other programmable data processing devices.

These computer program instructions can also be stored in a computer readable memory capable of guiding the computers or the other programmable data processing devices to work in a specific mode, so that a manufactured product including an instruction apparatus is generated via the instructions stored in the computer readable memory, and the instruction apparatus realizes the functions assigned in one or more flows of the flowcharts and/or one or more blocks of the block diagrams.

These computer program instructions can also be loaded to the computers or the other programmable data processing devices, so that processing realized by the computers is generated by executing a series of operation steps on the computers or the other programmable devices, and therefore the instructions executed on the computers or the other programmable devices provide a step of realizing the functions assigned in one or more flows of the flowcharts and/or one or more blocks of the block diagrams.

What are described above are only the particular embodiments of the disclosure, and are not used for limiting the protection scope of the disclosure.

INDUSTRIAL APPLICABILITY

The disclosure can obtain an initial frequency offset value according to a first frequency offset estimation value determined with a SRS or Preamble code sent by a UE, and a frequency offset estimation value of the current sub-frame is obtained within a range of the initial frequency offset estimation value and in combination with a dual pilot frequency offset estimation value. Thus, the precision of frequency offset estimation is ensured, and the complexity of large frequency offset estimation is reduced.

What is claimed is:

1. A method for frequency offset estimation comprising:
   performing initial channel estimation with a received Sounding Reference Signal (SRS) or Preamble code to obtain a first frequency offset estimation value of a current sub-frame;
   determining a frequency offset range in which the first frequency offset estimation value is located, and obtaining an initial frequency offset value corresponding to the first frequency offset estimation value according to a preset correspondence between the frequency offset range and the initial frequency offset value;
   determining a phase difference of adjacent pilot locations based on a received pilot sequence included in the current sub-frame, and obtaining, within the range defined by the initial frequency offset value corresponding to the first frequency offset estimation value, a dual pilot frequency offset estimation value according to the phase difference; and
   obtaining a frequency offset estimation value of the current sub-frame according to the initial frequency offset value corresponding to the first frequency offset estimation value and the dual pilot frequency offset estimation value.

2. The method according to claim 1, wherein the performing initial channel estimation with the received SRS or Preamble code to obtain the first frequency offset estimation value of the current sub-frame comprises:
   obtaining a channel estimation value $H^u$ and received data $Y^u$ by receiving the SRS or Preamble code of the current sub-frame;
   obtaining a time-domain sample value $w^u(n,ka_{R_x})$ of the current sub-frame on a receiving antenna $ka_{R_x}$ according to the channel estimation value $H^u$ and the received data $Y^u$ and in combination with a local pilot sequence $P^u$ and the following formula:

$$w^u(n,ka_{Rx})=IDFT(Y^u(k,ka_{Rx})\times H^{u*}(k,ka_{Rx}))\times (IDFT(P^u(k)))^*,$$

where n represents a series number of a sample point, u represents a User Equipment (UE) corresponding to the current sub-frame, k represents a sub-carrier index corresponding to the UE, $0 \leq k \leq 12N_{RB}^u - 1$, $ka_{Rx}$ represents an index of the receiving antenna, $N_{RB}^u$ represents a size of a Resource Block (RB) occupied by the UE, * represents a conjugate operation, and IDFT represents an inverse Fourier transform; and obtaining the first frequency offset estimation value $f_0^u(ka_{Rx})$ of the current sub-frame on the receiving antenna $ka_{Rx}$ according to phase information of the time-domain sample value $w^u(n,ka_{Rx})$ of the current sub-frame on the receiving antenna $ka_{Rx}$.

3. The method according to claim 2, wherein the obtaining the first frequency offset estimation value $f_0^u(ka_{Rx})$ of the current sub-frame on the receiving antenna $ka_{Rx}$ according to the phase information of the time-domain sample value $w^u(n,ka_{Rx})$ of the current sub-frame on the receiving antenna $ka_{Rx}$ comprises:

averaging respectively phase values of a first half and a second half of the time-domain sample value $w^u(n,ka_{Rx})$ of the current sub-frame to obtain a phase difference $\Delta\phi_1^u(ka_{Rx})$ of the first half and the second half; and obtaining the first frequency offset estimation value $f_0^u(ka_{Rx})$ of the current sub-frame on the receiving antenna $ka_{Rx}$ according to the following formula:

$$f_0^u(ka_{Rx}) = \frac{\Delta\phi_1^u(ka_{Rx}) \times 2 \times \Delta f}{\pi}.$$

4. The method according to claim 2, wherein the method further comprises:

performing a smoothing processing on the first frequency offset estimation value $f_0^u(ka_{Rx})$ of the current sub-frame on the receiving antenna $ka_{Rx}$ to obtain a smoothed first frequency offset estimation value $f_1^{(u)}(ka_{Rx})$ of the current sub-frame.

5. The method according to claim 1, wherein the step of determining the phase difference of adjacent pilot locations based on the received pilot sequence included in the current sub-frame and obtaining, within the range defined by the initial frequency offset value corresponding to the first frequency offset estimation value, the dual pilot frequency offset estimation value according to the phase difference comprises:

obtaining a phase difference $\Delta\phi_2^u(ka_{Rx})$ of two pilot locations on the receiving antenna $ka_{Rx}$ based on two pilot channel estimation values $H_1^u(k,ka_{Rx})$ and $H_2^u(k,ka_{Rx})$ obtained from two pilot sequences included in the current sub-frame on the receiving antenna $ka_{Rx}$ and according to the following formula:

$$\Delta\phi_2^u(ka_{Rx}) = angle\left(\sum_{k=0}^{12N_{RB}^2-1} H_1^u(k,ka_{Rx}) \times H_2^{u*}(k,ka_{Rx})\right),$$

where * represents a conjugate operator, and angle( ) represents an operator for calculating an angle;

obtaining a dual pilot frequency offset estimation result $\Delta f_2^{(u)}(ka_{Rx})$ on the receiving antenna $ka_{Rx}$ based on a time interval $\Delta t$ and the phase difference $\Delta\phi_2^u(ka_{Rx})$ of the two pilot sequences and according to the following formula:

$$\Delta f_2^{(u)}(ka_{Rx}) = \frac{\Delta\phi_2^u(ka_{Rx})}{2\pi \times \Delta t};$$

and obtaining, within the range defined by the initial frequency offset value $\overline{\Delta f_{initial}}^{(u)}(ka_{Rx})$, the dual pilot frequency offset estimation value $\Delta\Delta f_2(ka_{Rx})$ on the receiving antenna $ka_{Rx}$ based on the dual pilot frequency offset estimation result $\Delta f_2^{(u)}(ka_{Rx})$ and according to the following formula:

$$\Delta\Delta f_2(ka_{Rx}) = \Delta f_2^{(u)}(ka_{Rx}) - \overline{\Delta f_{initial}}^{(u)}(ka_{Rx}) + l \times T,$$

where T represents the maximum range values for the dual pilot frequency offset estimation value, and l represents a preset integer for defining the dual pilot frequency offset estimation value within a predetermined range.

6. The method according to claim 1, wherein after the obtaining the frequency offset estimation value of the current sub-frame according to the initial frequency offset value corresponding to the first frequency offset estimation value and the dual pilot frequency offset estimation value, the method further comprises:

performing a smoothing processing on the frequency offset estimation value $f^u(ka_{Rx})$ of the current sub-frame by means of filtering to obtain a smoothed frequency offset estimation value $f^{(u)}(ka_{Rx})$ of the current sub-frame.

7. A device for frequency offset estimation comprising:
a processor; and
a memory for storing instructions executable by the processor;
wherein the processor is configured to:
perform initial channel estimation with a received Sounding Reference Signal (SRS) or Preamble code to obtain a first frequency offset estimation value of a current sub-frame;
determine a frequency offset range in which the first frequency offset estimation value is located and obtain an initial frequency offset value corresponding to the first frequency offset estimation value according to a preset correspondence between the frequency offset range and the initial frequency offset value;
determine a phase difference of adjacent pilot locations based on a received pilot sequence included in the current sub-frame and obtain, within the range defined by the initial frequency offset value corresponding to the first frequency offset estimation value, a duel pilot frequency offset estimation value according to the phase difference; and
obtain a frequency offset estimation value of the current sub-frame according to the initial frequency offset value corresponding to the first frequency offset estimation value and the dual pilot frequency offset estimation value.

8. The device according to claim 7, wherein the processor is further configured to:
obtain a channel estimation value $H^u$ and received data $Y^u$ by receiving the SRS or Preamble code of the current sub-frame;
obtain a time-domain sample value $w^u(n,ka_{Rx})$ of the current sub-frame on a receiving antenna $ka_{Rx}$ according to the channel estimation value $H^u$ and the received data $Y^u$ and in combination with a local pilot sequence $P^u$ and the following formula:

$$w^u(n,ka_{Rx})=IDFT(Y^u(k,ka_{Rx})\times H^{u*}(k,ka_{Rx}))\times(IDFT(P^u(k)))^*,$$

where n represents a series number of a sample point, u represents a User Equipment (UE) corresponding to the current sub-frame, k represents a sub-carrier index corresponding to the UE, $0\leq k\leq 12N_{RB}^u-1$, $ka_{Rx}$ represents an index of the receiving antenna, $N_{RB}^u$ represents a size of a Resource Block (RB) occupied by the UE, * represents a conjugate operation, and IDFT represents an inverse Fourier transform; and obtain the first frequency offset estimation value $f_0^u(ka_{Rx})$ of the current sub-frame on the receiving antenna $ka_{Rx}$ according to phase information of the time-domain sample value $w^u(n,ka_{Rx})$ of the current sub-frame on the receiving antenna $ka_{Rx}$.

9. The device according to claim 8, wherein the processor is further configured to:

average respectively phase values of a first half and a second half of the time-domain sample value $w^u(n,ka_{Rx})$ of the current sub-frame to obtain a phase difference $\Delta\phi_1^u(ka_{Rx})$ of the first half and the second half; and obtain the first frequency offset estimation value $f_0^u(ka_{Rx})$ of the current sub-frame on the receiving antenna $ka_{Rx}$ according to the following formula:

$$f_0^u(ka_{Rx}) = \frac{\Delta\phi_1^u(ka_{Rx})\times 2\times\Delta f}{\pi}.$$

10. The device according to claim 8, wherein the processor is further configured to perform a smoothing processing on the first frequency offset estimation value $f_0^u(ka_{Rx})$ of the current sub-frame on the receiving antenna $ka_{Rx}$ to obtain a smoothed first frequency offset estimation value $f_1^{(u)}(ka_{Rx})$ of the current sub-frame.

11. The device according to claim 7, wherein the processor is further configured to:

obtain a phase difference $\Delta\phi_2^u(ka_{Rx})$ of two pilot locations on the receiving antenna $ka_{Rx}$ based on two pilot channel estimation values $H_1^u(k,ka_{Rx})$ and $H_2^u(k,ka_{Rx})$ obtained from two pilot sequences included in the current sub-frame on the receiving antenna $ka_{Rx}$ and according to the following formula:

$$\Delta\phi_2^u(ka_{Rx}) = \text{angle}\left(\sum_{k=0}^{12N_{RB}^2-1} H_1^u(k,ka_{Rx})\times H_2^{u*}(k,ka_{Rx})\right),$$

where * represents a conjugate operator, and angle( ) represents an operator for calculating an angle;

obtain a dual pilot frequency offset estimation result $\Delta f_2^{(u)}(ka_{Rx})$ on the receiving antenna $ka_{Rx}$ based on a time interval $\Delta t$ and a phase difference $\Delta\phi_2^u(ka_{Rx})$ of the two pilot sequences and according to the following formula:

$$\Delta f_2^{(u)}(ka_{Rx}) = \frac{\Delta\phi_2^u(ka_{Rx})}{2\pi\times\Delta t};$$

and obtain, within the range defined by the initial frequency offset value $\overline{\Delta f_{initial}}^{(u)}(ka_{Rx})$, a dual pilot frequency offset estimation value $\Delta\Delta f_2(ka_{Rx})$ on the receiving antenna $ka_{Rx}$ based on the dual pilot frequency offset estimation result $\Delta f_2^{(u)}(ka_{Rx})$ and according to the following formula:

$$\Delta\Delta f_2(ka_{Rx})=\Delta f_2^{(u)}(ka_{Rx})-\overline{\Delta f_{initial}}^{(u)}(ka_{Rx})+l\times T,$$

where T represents the maximum range values for the dual pilot frequency offset estimation value, and l represents a preset integer for defining the dual pilot frequency offset estimation value within a predetermined range.

12. The device according claim 7, wherein the processor is further configured to perform a smoothing processing on the frequency offset estimation value $f^u(ka_{Rx})$ of the current sub-frame by means of filtering to obtain a smoothed frequency offset estimation value $f^{(u)}(ka_{Rx})$ of the current sub-frame.

13. A non-transitory computer readable storage medium in which a computer program is stored, wherein the computer program comprising executable instructions that cause a computer to:

perform initial channel estimation with a received Sounding Reference Signal (SRS) or Preamble code to obtain a first frequency offset estimation value of a current sub-frame;

determine a frequency offset range in which the first frequency offset estimation value is located, and obtain an initial frequency offset value corresponding to the first frequency offset estimation value according to a preset correspondence between the frequency offset range and the initial frequency offset value;

determine a phase difference of adjacent pilot locations based on a received pilot sequence included in the current sub-frame, and obtain, within the range defined by the initial frequency offset value corresponding to the first frequency offset estimation value, a dual pilot frequency offset estimation value according to the phase difference; and obtain a frequency offset estimation value of the current sub-frame according to the initial frequency offset value corresponding to the first frequency offset estimation value and the dual pilot frequency offset estimation value.

14. The non-transitory computer readable storage medium according to claim 13, wherein performing initial channel estimation with the received SRS or Preamble code to obtain the first frequency offset estimation value of the current sub-frame comprises:

obtaining a channel estimation value $H^u$ and received data $Y^u$ by receiving the SRS or Preamble code of the current sub-frame;

obtaining a time-domain sample value $w^u(n,ka_{Rx})$ of the current sub-frame on a receiving antenna $ka_{Rx}$ according to the channel estimation value $H^u$ and the received data $Y^u$ and in combination with a local pilot sequence $P^u$ and the following formula:

$$w^u(n,ka_{Rx})=IDFT(Y^u(k,ka_{Rx})\times H^{u*}(k,ka_{Rx}))\times(IDFT(P^u(k)))^*,$$

where n represents a series number of a sample point, u represents a User Equipment (UE) corresponding to the current sub-frame, k represents a sub-carrier index corresponding to the UE, $0\leq k\leq 12N_{RB}^u-1$, $ka_{Rx}$ represents an index of the receiving antenna, $N_{RB}^u$ represents a size of a Resource Block (RB) occupied by the UE, * represents a conjugate operation, and IDFT represents an inverse Fourier transform; and obtaining the first frequency offset estimation value $f_0^u(ka_{Rx})$ of the current sub-frame on the receiving antenna $ka_{Rx}$ according to phase information of the time-domain sample value $w^u(n,ka_{Rx})$ of the current sub-frame on the receiving antenna $ka_{Rx}$.

15. The non-transitory computer readable storage medium according to claim 14, wherein obtaining the first frequency offset estimation value $f_0^u(ka_{Rx})$ of the current sub-frame on the receiving antenna $ka_{Rx}$ according to the phase information of the time-domain sample value $w^u(n,ka_{Rx})$ of the current sub-frame on the receiving antenna $ka_{Rx}$ comprises:

averaging respectively phase values of a first half and a second half of the time-domain sample value $w^u(n,ka_{Rx})$ of the current sub-frame to obtain a phase difference $\Delta\phi_1^u(ka_{Rx})$ of the first half and the second half; and obtaining the first frequency offset estimation value $f_0^u(ka_{Rx})$ of the current sub-frame on the receiving antenna $ka_{Rx}$ according to the following formula:

$$f_0^u(ka_{Rx}) = \frac{\Delta\phi_1^u(ka_{Rx}) \times 2 \times \Delta f}{\pi}.$$

16. The non-transitory computer readable storage medium according to claim 14, wherein the computer program comprising executable instructions that further cause a computer to:

perform a smoothing processing on the first frequency offset estimation value $f_0^u(ka_{Rx})$ of the current sub-frame on the receiving antenna $ka_{Rx}$ to obtain a smoothed first frequency offset estimation value $f_1^{(u)}(ka_{Rx})$ of the current sub-frame.

17. The non-transitory computer readable storage medium according to claim 13, wherein the step of determining the phase difference of adjacent pilot locations based on the received pilot sequence included in the current sub-frame and obtaining, within the range defined by the initial frequency offset value corresponding to the first frequency offset estimation value, the dual pilot frequency offset estimation value according to the phase difference comprises:

obtaining a phase difference $\Delta\phi_2^u(ka_{Rx})$ of two pilot locations on the receiving antenna $ka_{Rx}$ based on two pilot channel estimation values $H_1^u(k,ka_{Rx})$ and $H_2^u(k,ka_{Rx})$ obtained from two pilot sequences included in the current sub-frame on the receiving antenna $ka_{Rx}$ and according to the following formula:

$$\Delta\phi_2^u(ka_{Rx}) = \text{angle}\left(\sum_{k=0}^{12N_{RB}^2-1} H_1^u(k,ka_{Rx}) \times H_2^{u*}(k,ka_{Rx})\right),$$

where * represents a conjugate operator, and angle( ) represents an operator for calculating an angle;

obtaining a dual pilot frequency offset estimation result $\Delta f_2^{(u)}(ka_{Rx})$ on the receiving antenna $ka_{Rx}$ based on a time interval $\Delta t$ and the phase difference $\Delta\phi_2^u(ka_{Rx})$ of the two pilot sequences and according to the following formula:

$$\Delta f_2^{(u)}(ka_{Rx}) = \frac{\Delta\phi_2^u(ka_{Rx})}{2\pi \times \Delta t};$$

and obtaining, within the range defined by the initial frequency offset value $\overline{\Delta f_{initial}}^{(u)}(ka_{Rx})$, the dual pilot frequency offset estimation value $\Delta\Delta f_2(ka_{Rx})$ on the receiving antenna $ka_{Rx}$ based on the dual pilot frequency offset estimation result $\Delta f_2^{(u)}(ka_{Rx})$ and according to the following formula:

$$\Delta\Delta f_2(ka_{Rx}) = \Delta f_2^{(u)}(ka_{Rx}) - \overline{\Delta f_{initial}}^{(u)}(ka_{Rx}) + l \times T,$$

where T represents the maximum range values for the dual pilot frequency offset estimation value, and l represents a preset integer for defining the dual pilot frequency offset estimation value within a predetermined range.

18. The non-transitory computer readable storage medium according to claim 13, wherein the computer program comprising executable instructions that further cause a computer to perform a smoothing processing on the frequency offset estimation value $f^u(ka_{Rx})$ of the current sub-frame by means of filtering to obtain a smoothed frequency offset estimation value $f^{(u)}(ka_{Rx})$ of the current sub-frame, after obtaining the frequency offset estimation value of the current sub-frame according to the initial frequency offset value corresponding to the first frequency offset estimation value and the dual pilot frequency offset estimation value.

* * * * *